United States Patent
Sun et al.

(10) Patent No.: US 10,109,030 B1
(45) Date of Patent: Oct. 23, 2018

(54) QUEUE-BASED GPU VIRTUALIZATION AND MANAGEMENT SYSTEM

(71) Applicant: EMC IP Holding Company LLC, Hopkinton, MA (US)

(72) Inventors: Yifan Sun, Abington, MA (US); Layne Peng, Shanghai (CN); Robert A. Lincourt, Jr., Pawtucket, RI (US); John Cardente, Milford, MA (US); John S. Harwood, Paxton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 43 days.

(21) Appl. No.: 15/391,223

(22) Filed: Dec. 27, 2016

(51) Int. Cl.
    *G06T 1/20* (2006.01)
    *G06T 1/60* (2006.01)

(52) U.S. Cl.
    CPC . *G06T 1/20* (2013.01); *G06T 1/60* (2013.01)

(58) Field of Classification Search
    None
    See application file for complete search history.

(56) References Cited

U.S. PATENT DOCUMENTS

| | | | |
|---|---|---|---|
| 9,836,354 B1 | 12/2017 | Potlapally et al. | |
| 9,984,648 B2 | 5/2018 | Chakraborty et al. | |
| 2011/0131430 A1* | 6/2011 | Krishnamurthy | G06F 1/3203 713/320 |
| 2012/0011401 A1 | 1/2012 | Ranganathan et al. | |
| 2014/0198112 A1* | 7/2014 | Miyamoto | G06T 1/20 345/522 |
| 2014/0325073 A1* | 10/2014 | Urbach | G06F 9/5016 709/226 |
| 2015/0317192 A1* | 11/2015 | Munshi | G06F 8/41 719/328 |
| 2016/0247248 A1 | 8/2016 | Ha et al. | |
| 2017/0293758 A1* | 10/2017 | Saxena | G06F 21/552 |
| 2017/0353397 A1* | 12/2017 | Che | H04L 67/10 |

OTHER PUBLICATIONS

Tony Paikeday, "Seven Service Providers Delivering the GPU-Accelerated Cloud—Built on NVIDIA GRID," https://blogs.nvidia.com/blog/2016/09/27/the-gpu-accelerated-cloud/, Sep. 27, 2016, 4 pages.

(Continued)

*Primary Examiner* — Frank S Chen
(74) *Attorney, Agent, or Firm* — Ryan, Mason & Lewis, LLP

(57) ABSTRACT

A method implemented by a server enables sharing of GPU resources by multiple clients. The server receives a request from a first client for GPU services. The request includes a first block of GPU code of an application executing on the first client. A first task corresponding to the first block of GPU code is enqueued in a task queue. The task queue includes a second task that corresponds to a second block of GPU code of an application executing on a second client. The server schedules a time for executing the first task using a GPU device that is assigned to the first client, and dispatches the first task to a GPU worker process to execute the first task at the scheduled time using the GPU device. The GPU device is shared, either temporally or spatially, by the first and second clients for executing the first and second tasks.

20 Claims, 4 Drawing Sheets

(56) References Cited

OTHER PUBLICATIONS amazon.com, "Linux Accelerated Computing Instances," http://docs.aws.amazon.com/AWSEC2/latest/UserGuide/using_cluster_computing.html, 9 pages.
Tiffany Trader, "Microsoft Puts GPU Boosters on Azure Cloud," https://www.hpcwire.com/2016/09/29/microsoft-puts-gpu-boosters-on-azure-cloud/, Sep. 29, 2015, 3 pages.
U.S. Appl. No. 15/487,887 filed in the name of Yifan Sun et al. on Apr. 14, 2017 and entitled "Managing Access to a Resource Pool of Graphics Processing Units Under Fine Grain Control."
Minsoo Rhu et al., "vDNN: Virtualized Deep Neural Networks for Scalable, Memory-Efficient Neural Network Design," 49th IEEE/ACM International Symposium on Microarchitecture (Micro-49), 2016, 13 pages.
Tensorflow, "Tensor/Tensorflow," https://github.com/tensorflow/tensorflow/blob/master/tensorflow/python/training/saver.py, 2015, 32 pages.
S. Han et al., "Deep Compression: Compressing Deep Neural Networks with Pruning, Trained Quantization and Huffman Coding," arXiv:1510.00149v5, Published as a conference paper at International Conference on Learning Representations (ICLR), Feb. 16, 2016, 14 pages.

* cited by examiner

QUEUE-BASED GPU VIRTUALIZATION AND MANAGEMENT SYSTEM

FIELD

This disclosure relates generally to techniques for managing and utilizing processor resources in a computing system.

BACKGROUND

Various types of special-purpose processors, such as graphics processing units (GPUs) for general purpose computing, have been developed to accelerate the processing of specific types of workloads. Architecturally, a GPU has a massively parallel architecture which typically comprises hundreds or thousands of cores that are configured to concurrently execute hundreds or thousands of threads at a given time. This is in contrast to a standard central processing unit (CPU) architecture which typically comprises a few cores and associated cache memory, which are optimized for sequential serial processing and handling a few software threads at a given time.

The processing capabilities of GPU resources are currently being utilized in various applications to accelerate the processing of highly-parallelized computational workloads in various technical fields. In particular, general-purpose computing on GPU (GPGPU) is utilized for high-throughput, accelerated processing of compute kernels for workloads (e.g., vector-based computations, matrix-based computations, etc.) that exhibit data-parallelism. For example, GPUs are used to accelerate data processing in high-performance computing (HPC) and embedded computing systems, for various applications such as financial modeling, scientific research, machine learning, data mining, video data transcoding, image analysis, image recognition, virus pattern matching, augmented reality, encryption/decryption, weather forecasting, big data comparisons, and other applications with computational workloads that have an inherently parallel nature.

Due to the high-throughput and low energy consumption per operation exhibited by GPUs, it is anticipated that GPU-as-a-Service (GPUaaS) will become mainstream in the near future, wherein cloud-based systems will implement GPU powered blades for various types of processing. In current server-based implementations, individual GPU devices are typically allocated to individual users on a dedicated basis, which can result in extremely low utilization of GPU devices. For example, in such systems, an IT manager can only statically allocate GPU devices to users on an individual basis, whereby GPU devices are not shared among the users. As a consequence, even when a given user is not using his/her dedicated GPU, other users cannot utilize the GPU. Due to the high cost of acquisition, the implementation of a large number of GPU devices for a computing platform can be a major investment. In almost all fields that utilize GPU resources, ranging from research and development, to production, GPU device utilization is typically very low. Therefore, to reduce the acquisition and operational costs associated with GPU resources, it would be highly desirable to implement a system that can manage GPU resources in a way that allows multiple users to share GPU resources without experiencing performance degradation.

SUMMARY

Illustrative embodiments of the invention generally include techniques for implementing a queue-based GPU virtualization and management system that is configured to allow multiple users to share GPU resources in a computing system.

For example, one embodiment of the invention includes a method that is implemented by a computer server. The computer server receives a first service request from a first client system for GPU services provided by the computer server, wherein the first service request comprises a first block of GPU program code of a GPU-accelerated application executing on the first client system. The computer server enqueues a first task in a task queue, wherein the first task corresponds to the first block of GPU program code received from the first client system. The task queue further comprises a second task that corresponds to a second block of GPU program code of a GPU-accelerated application executing on a second client system. The computer server schedules a time for executing the first task using a GPU device that is assigned to the first client system, and dispatches the first task to a server backend GPU worker process to handle execution of the first task at the scheduled time using the GPU device. The utilization of the GPU device is shared by the first and second client systems for executing the first and second tasks. For example, in one embodiment, the utilization of the GPU device is shared temporally, wherein the first and second tasks are executed using the GPU device at different times. In another embodiment, the utilization of the GPU device is shared spatially, wherein both the first and second tasks are concurrently executed using the GPU device.

Other embodiments of the invention include, without limitation, systems and articles of manufacture comprising processor-readable storage media.

DETAILED DESCRIPTION

Illustrative embodiments of the invention will now be explained in further detail with regard to systems and methods for implementing a queue-based GPU virtualization and management system that is configured to allow users to share GPU resources in a computing system (e.g., data center). The exemplary GPU virtualization and management techniques discussed herein can be implemented in servers of a computing system to enable GPUaaS for shared access to GPU resources.

Figure 1:
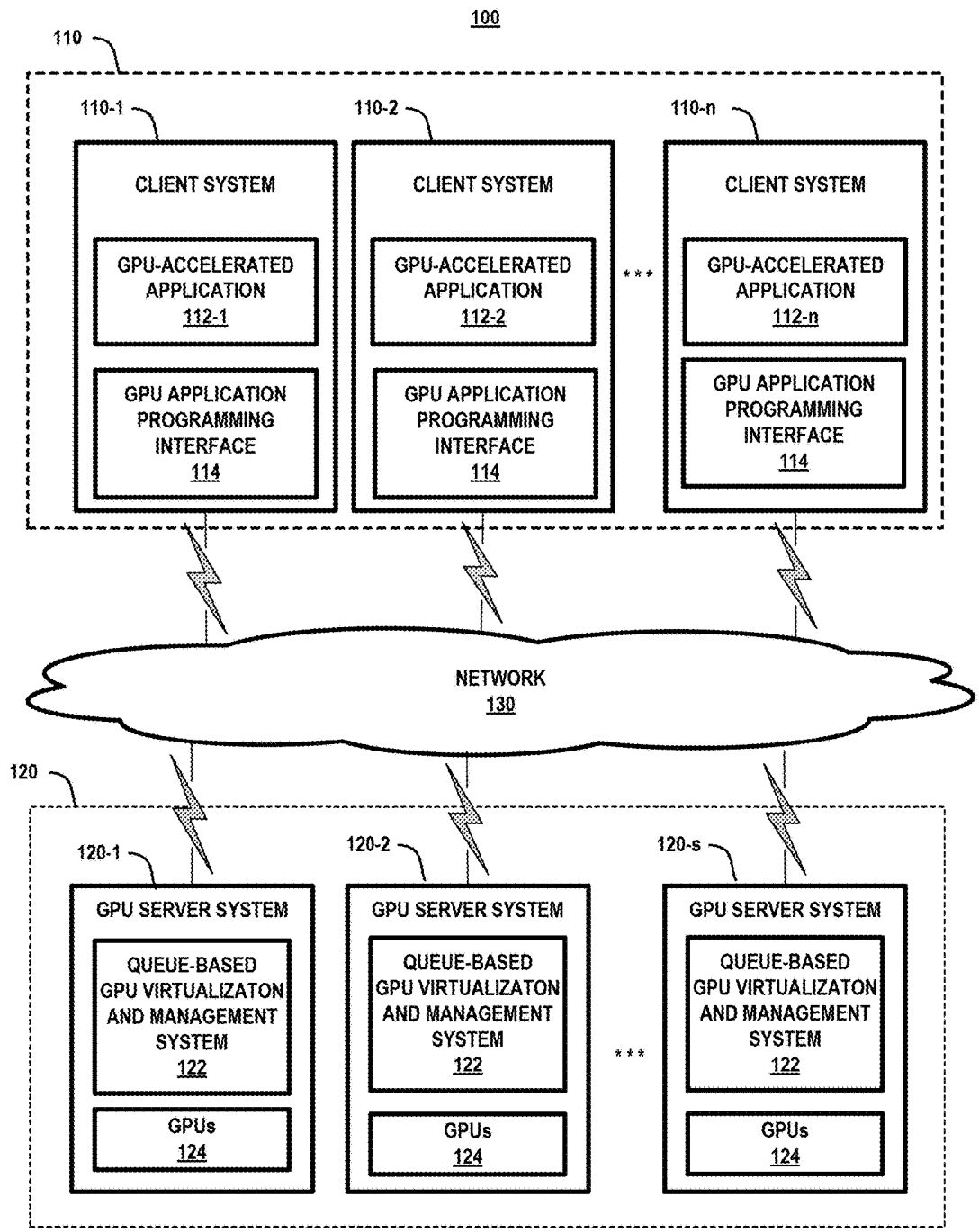
FIG. 1 is a high-level schematic illustration of a computing system which implements a queue-based GPU virtualization and management system that is configured to enable sharing of GPU resources, according to an embodiment of the invention.

For example, FIG. 1 is a high-level schematic illustration of a computing system 100 which implements a queue-based GPU virtualization and management system that is configured to enable sharing of GPU resources, according to an embodiment of the invention. The computing system 100 comprises a plurality (n) of client systems 110-1, 110-2, ..., 110-n (collectively referred to as client systems 110), and a server cluster 120 (e.g., server farm) comprising a plurality (s) of GPU servers 120-1, 120-2, ..., 120-s. The client systems 110 and server cluster 120 are operatively connected over a communications network 130. The communications network 130 is configured to enable network communication between the client systems 110 and the server cluster 120, as well as to enable peer-to-peer network communication between the GPU servers 120-1, 120-2, ..., 120-s of the server cluster 120.

While the communications network 130 is generically depicted in FIG. 1, it is to be understood that the communications network 130 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 130 in some embodiments comprises combinations of multiple different types of communications networks each comprising network devices configured to communicate using Internet Protocol (IP) or other related communication protocols. The network 130 comprises intermediate points (such as routers, switches, etc.) and other elements that form a network backbone to establish communication paths and enable communication between network endpoints.

While FIG. 1 provides a generic illustration of a server cluster 120, it is to be understood that the server cluster 120 can be implemented as part of a private or public computing platform (e.g. cloud computing system, online social network). For example, the server cluster 120 can be implemented in a data center or as part of an enterprise network of a private or public cloud computing system. Furthermore, the GPU servers 120-1, 120-2, ..., 120-s may implement one of many types of commercially available server systems including, but not limited to, a Windows server, a Sun Solaris server, an HP server, a Linux server, etc. The sever cluster 120 can be a constituent component of a data center or cloud computing platform that performs data computing and data storage functions to support one or more network applications and/or on-line services that deliver consumer or business applications and services to multiple end users, service providers, and/or organizations.

The client systems 110 comprise various types of computing devices such as desktop computers, laptop computers, electronic tablets, etc. In another embodiment, the client systems 110 may comprise servers in a data center. As shown in FIG. 1, the client systems 110-1, 110-2, ..., 110-n each host a respective GPU-accelerated application 112-1, 112-2, ..., 112-n (collectively, GPU-accelerated applications 112), and a GPU application programming interface (API) 114. As further shown, the GPU servers 120-1, 120-2, ..., 120-s each comprise a queue-based GPU virtualization and management system 122 and one or more GPU devices 124.

The GPU-accelerated applications 112 comprise application programs having compute-intensive portions or routines (e.g., compute kernels) which are included within the program code of the GPU-accelerated applications 112, and which are offloaded to a GPU for accelerated computing. It is to be understood that the term "GPU-accelerated application" as used herein refers to any type of software application, including desktop applications, server applications, database applications, and mobile applications, which comprise executable GPU-related program code that is compiled for processing by high throughput accelerators such as GPUs.

The GPU APIs 114 of the client systems 110 comprises library functions and protocols that are configured to communicate with the queue-based GPU virtualization and management systems 122 implemented by the GPU servers 120-1, 120-2, ..., 120-s of the server cluster 120 to access the GPU processing services provided by server cluster 120. For example, the GPU APIs 114 are configured transmit service requests to the queue-based GPU virtualization and management systems 122 to accesses GPU processing services provided by the GPU servers 120-1, 120-2, ..., 120-s of the server cluster 120. The service requests are transmitted along with blocks of application code (e.g., compute kernels) of the GPU-accelerated applications 112 and any associated data, for processing by one or more GPU devices 124 of the server cluster 120. In addition, the GPU APIs 114 comprise routines to handle local GPU-related processing such as executing GPU application code, manipulating data, handling errors, etc.

In one embodiment, the GPU APIs 114 are implemented as extensions to commercially available GPU API platforms, such as CUDA®, which is a parallel computing platform and application programming interface created by NVIDIA. The CUDA API enables the use of CUDA-enabled GPUs for general purpose processing. The CUDA platform is a software layer that allows direct access to the instruction set and parallel computational elements of a GPU, for executing compute kernels. In one embodiment of the invention, the GPU APIs 114 comprise "shim" layers of a standard, commercially available API. As is known in the art of computer programming, a shim layer is a library that transparently intercepts API calls and modifies arguments that are passed for a given operation, handles the operation itself, or redirects the operation to another entity. In this regard, the GPU APIs 114 may comprise shim layers that are utilized to extend the functionality of an existing API (e.g., CUDA) to implement the functionalities of the GPU APIs 114 as described herein.

The queue-based GPU virtualization and management systems 122 are configured to allow shared access and utilization of the GPU devices 124 of the GPU server cluster 120 by the plurality of client systems 110. In particular, the queue-based GPU virtualization and management systems 122 of the GPU servers 120-1, 120-2, ..., 120-s allow the client systems 110 to concurrently use the GPU devices 124 as if the GPU devices 124 are allocated to the client systems 110 in a dedicated manner. For example, assume that the GPU API 114 of the client system 110-1 sends a service request to the queue-based GPU virtualization and management system 122 of the GPU server 120-1 for GPU processing services provided by the GPU server 120-1 using the associated GPU devices 124. In one embodiment, the service request comprises a block of GPU program code of the GPU-accelerated application 112-1 executing on the client system 110-1.

The queue-based GPU virtualization and management system 122 of the GPU server 120-1 enqueues a first task in a task queue, wherein the first task corresponds to the block of GPU program code received from the GPU API 114 of the client system 110-1. Assume further that the task queue further comprises a second task which corresponds to a block of GPU program code of the GPU-accelerated application 112-2 executing on the client system 110-2. The queue-based GPU virtualization and management system 122 of the GPU server 120-1 schedules a time for executing the first task using a given GPU device (of the GPU devices 124) which is assigned to the client system 110-1, and dispatches the first task to a server backend GPU worker process to handle execution of the first task at the scheduled time using the given GPU device assigned to the client system 110-1.

In this example embodiment, the given GPU device which is assigned to the client system 110-1 to execute the first task dispatched from the task queue can also be assigned to the client system 110-2 to execute the second task when the second task is dispatched from the task queue. In this regard, the same GPU device is shared by the different client systems 110-1 and 110-2 for executing the first and second tasks. The queue-based GPU virtualization and management system 112 allows the different client systems 110-1 and 110-2 to share the GPU devices temporally and/or spatially. For example, in one embodiment, the utilization of the GPU device is shared temporally, wherein the first and second tasks are executed using the GPU device at different times. In another embodiment, the utilization of the GPU device is shared spatially, wherein both the first and second tasks are concurrently executed using the GPU device.

This is in contrast to conventional systems in which, as noted above, individual users are assigned to individual GPU devices on a dedicated basis, which leads to low utilization of GPU devices. In particular, in current GPU configuration systems, data center managers will allocate individual GPU devices to individual users on a dedicated basis. In most use scenarios, a given user does not utilize the assigned GPU device for 100% of the time that the GPU device is allocated to the user. Even when a GPU-accelerated application is executing, the control flow will frequently return to a CPU for processing non-GPU related code (e.g., compute kernels) of the GPU-accelerated application. The GPU utilization further degrades when a user requests more than one GPU but only achieves peak utilization for short durations over the program's execution.

In this regard, we define a first aspect of GPU utilization as temporal utilization. Assume that a given user is allocated to a GPU device on a GPU server. If the user is not currently executing a GPU-accelerated application on a client system, or if the user is executing a GPU-accelerated application program on the client system, but the GPU-accelerated application program is not current executing GPU-related code in the current application state, the GPU device is idling and not being utilized by the user. Another user who needs the GPU resource at the moment cannot get access due to lack of available GPU devices. However, the queue-based GPU virtualization and management system 112 of a given GPU server allows two different client systems to have pending tasks in a task queue which are designated for execution using the same GPU device, but at different times.

A second aspect of GPU utilization is spatial utilization. In instances where a given GPU device is executing a compute kernel, but the compute kernel does not fully consume the resources of the GPU device, the queue-based GPU virtualization and management system 112 of a given GPU server is configured to coordinate the concurrent execution of multiple compute kernels (associated with different users) in the given GPU device to utilize the internal resource of a GPU more efficiently.

Figure 2:
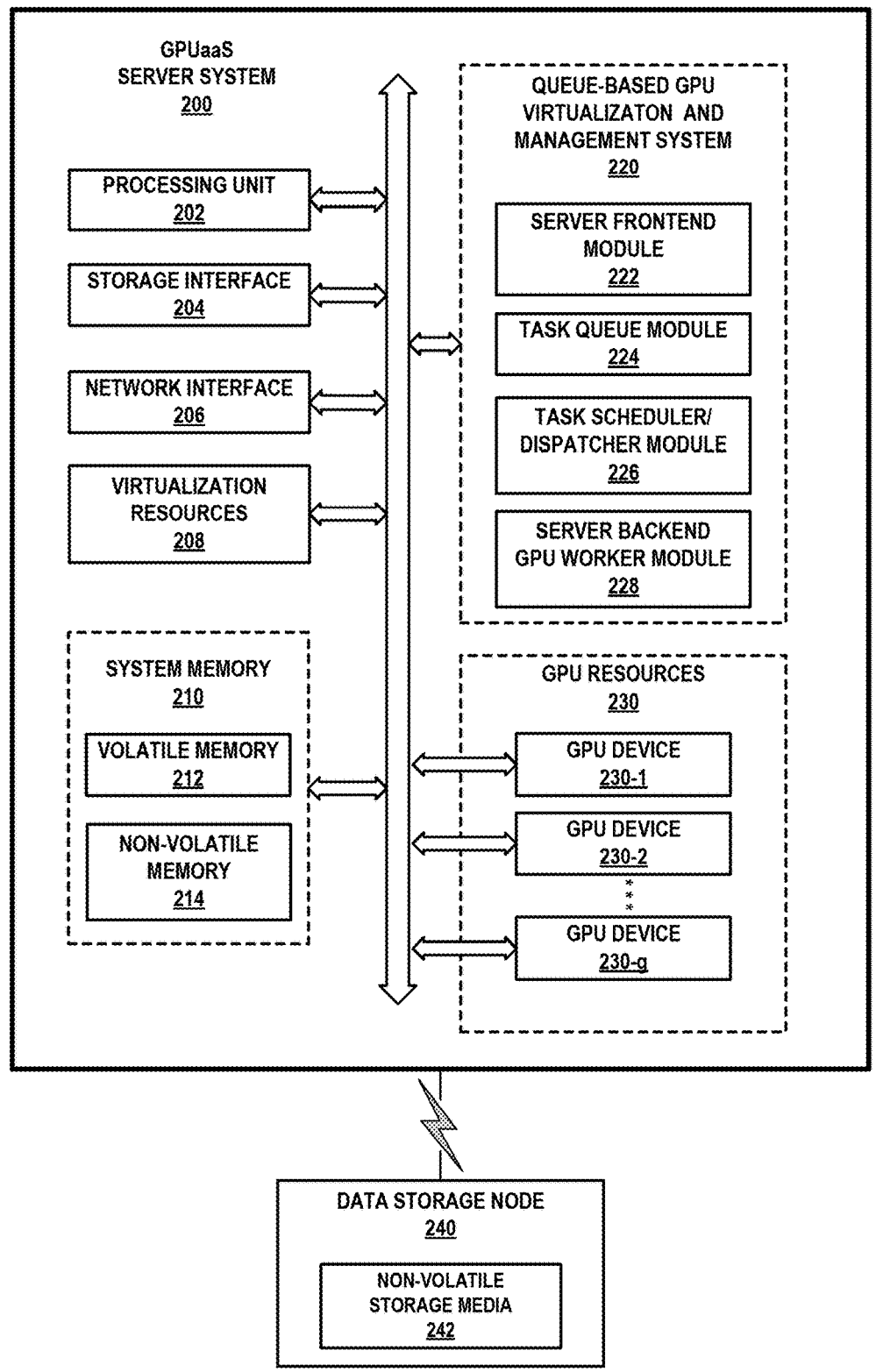
FIG. 2 schematically illustrates an embodiment of a server system of the computing system of FIG. 1, according to an embodiment of the invention.

FIG. 2 schematically illustrates a server system which is implemented in the computing system of FIG. 1, according to an embodiment of the invention. More specifically, FIG. 2 shows an embodiment of a GPU server system 200 that is configured to support GPUaaS for shared access to GPU resources by multiple client systems, according to an embodiment of the invention. The GPU server system 200 comprises a processing unit 202, storage interface circuitry 204, network interface circuitry 206, virtualization resources 208, system memory 210, a queue-based GPU virtualization and management system 220, and GPU resources 230. The system memory 210 comprises volatile memory 212 and non-volatile memory 214. The GPU resources 230 comprise one or more GPU devices 230-1, 230-2, . . . , 230-g. The queue-based GPU virtualization and management system 220 comprises a server frontend module 222, a task queue module 224, a task scheduler and dispatcher module 226, and a server backend GPU worker module 228.

As further shown in FIG. 2, a data storage node 240 is coupled to the GPU server system 200. The data storage node 240 comprises non-volatile storage media 242 to provide persistent data storage for the GPU server system 200. The non-volatile storage media 242 may include one or more different types of persistent storage devices such as HDDs (hard disk drives) or SSDs (solid-state drives), or other types and combinations of non-volatile memory. In one embodiment, the data storage node 240 is implemented using, for example, an enterprise-class storage platform comprising high performance, scalable storage arrays, which can be implemented for hyper-scale computing systems.

In one embodiment, the various system modules 222, 224, 226, and 228 of the queue-based GPU virtualization and management system 220 comprise software modules that are persistently stored in a storage device (e.g., non-volatile storage media 242). The system modules 222, 224, 226, and 228 are loaded into the system memory resources (e.g., volatile memory 212 and/or non-volatile memory 214), and executed by the processing unit 202 to perform various functions as described herein. In this regard, the system memory 210 resources and the non-volatile storage media 242, and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processing unit 202 may comprise one or more processors that are configured to process program instructions and data to execute a native operating system (OS) and applications that run on the GPU server system 200. For example, the processing unit 202 may comprise one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general purpose processor.

The storage interface circuitry 204 enables the processing unit 202 to interface and communicate with the system memory 210, the data storage node 240, and other local storage and off-infrastructure storage media on the GPU server system 200 or data storage node 240, using one or more standard communication and/or storage control protocols to read data from or write data to volatile and non-volatile memory/storage devices. The network interface circuitry 206 enables the GPU server system 200 to interface and communicate with a network and other system components. The network interface circuitry 206 may comprise conventional transceivers of a type well known in the art (e.g., network interface cards, I/O adaptors, etc.).

The virtualization resources 208 can be instantiated to execute one or more applications or functions which are hosted by the GPU server system 200. For example, in one embodiment, the virtualization resources 208 comprise virtual machines that are implemented using a hypervisor platform which executes on the GPU server system 200, wherein one or more virtual machines can be instantiated to execute functions of the GPU server system 200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices, of the GPU server system 200, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 208 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the GPU server system 200. In yet another embodiment, containers may be used in combination with other virtualization infrastructure such as virtual machines implemented using a hypervisor, wherein Docker containers or other types of LXCs are configured to run on virtual machines in a multi-tenant environment.

The system memory 210 comprises electronic storage media such as random access memory (RAM), read-only memory (ROM), or other types of memory, in any combination. The term "memory" or "system memory" as used herein refers to volatile and/or non-volatile memory which is utilized to store application program instructions that are read and processed by the processing unit 202 to execute a native operating system and one or more applications hosted by the GPU server system 200, and to temporarily store data that is utilized and/or generated by the native OS and application programs running on the GPU server system 200. For example, the volatile memory 212 of the system memory 210 may be a dynamic random-access memory (e.g., DRAM) or other forms of volatile random-access memory. The non-volatile memory 214 may comprise a storage-class memory (SCM) that is accessible as a memory resource. For example, the non-volatile memory 214 may be a NAND Flash storage device, a SSD (solid state drive) storage device, or other types of next generation non-volatile memory (NGNVM) devices.

As noted above, the queue-based GPU virtualization and management system 220 is configured to allow multiple users/client systems to share the GPU devices 230-1, 230-2, ..., 230-g of the GPU server system 200, wherein the sharing is implemented temporally and/or spatially. The server frontend module 222 implements functions to receive and process incoming requests for GPU services from client systems (e.g., requests received from GPU APIs 114 of the client systems 110, FIG. 1). The server frontend module 222 implements standard interfaces and functions to enable client/server communication between the client systems 110 and the GPU server system 200. In addition, the server frontend module 222 comprises methods to pass incoming service requests for GPU services from the client systems 110 to the task queue module 224.

The task queue module 224 comprises functions for implementing and managing a task queue, generating tasks (e.g., execution units) based on service requests received from client systems, and enqueuing the tasks on the task queue. The different tasks that are enqueued in the task queue correspond to different blocks of GPU program code of GPU-accelerated applications executing on the client systems 110, which are sent to the GPU server system 200 for remote processing using the GPU resources 230. The task scheduler and dispatcher module 226 implements functions for assigning GPU devices to client systems, scheduling execution times for tasks that are placed on the task queue, and dispatching tasks to server backend GPU workers, which are implemented by the server backend GPU worker module 228, to handle execution of the tasks at the scheduled times using the assigned GPU devices. The server backend GPU worker module 228 implements functions to return GPU processing results of tasks to the requesting client systems. The various modules 222, 224, 226, and 228 of the queue-based GPU virtualization and management system 220 collectively operate to provide fine-grained sharing of the GPU resources 230 among multiple client systems, both temporally and spatially, using various techniques as explained in further detail below.

Figure 3:
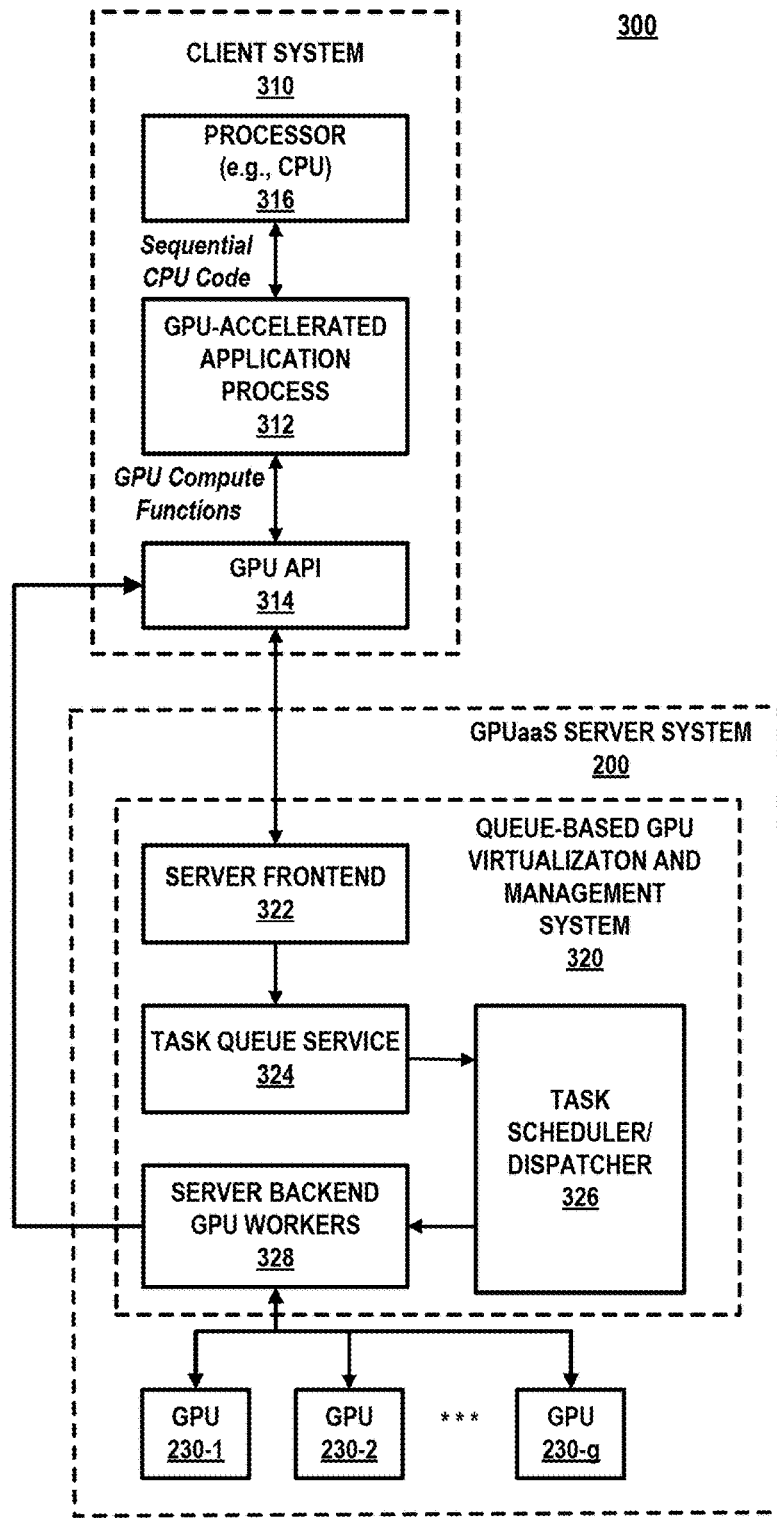
FIG. 3 schematically illustrates a run-time implementation of a client system and the GPU server system 200 of FIG. 2, according to an embodiment of the invention.

FIG. 3 schematically illustrates a run-time implementation 300 of a client system 310 and the GPU server system 200 of FIG. 2, according to an embodiment of the invention. As shown in FIG. 3, a GPU-accelerated application process 312 executes on the client system 310. The client system 310 comprises a processor 316 (e.g., a CPU) which receives and executes sequential CPU code portions of the GPU-accelerated application process 312. The GPU-accelerated application process 312 passes GPU-related code (e.g., GPU compute functions, kernels, etc.) to a run-time implementation of a GPU API 314. The run-time implementation of the GPU API 314 comprises routines that are configured for local processing of certain GPU code, e.g., manipulating data, error handling, etc., while the run-time implementation of the GPU API 314 utilizes the GPU server system 200 to execute compute-intensive code portions of the GPU-accelerated application process 312. In this regard, the GPU API 314 is further configured to communicate with the GPU server system 200 and transmit GPU service requests along with GPU code and associated data for processing by one or more GPU devices 230-1, 230-2, 230-g, on the GPU server system 200.

As further shown in FIG. 3, a run-time implementation of a queue-based GPU virtualization and management system 320 comprises a server frontend 322, a task queue service 324, a task scheduler/dispatcher 326, and server backend GPU workers 328. The server frontend 322 and task queue service 324 represent running instances of the server frontend module 222 and the task queue module 224, respectively, shown in FIG. 2. In addition, the task scheduler/dispatcher 326 and the server backend GPU workers 328 represent running instances of the task scheduler/dispatcher module 226 and the server backend GPU worker module 228, respectively, shown in FIG. 2. During run-time, the server frontend 322 implements methods to handle requests that are received from the GPU API 314 of the client system 310. For example, the server frontend 322 comprises methods to process client credentials, perform authentication, and perform other types of functions to authenticate a user of the client system 310 and establish a communications session with the client system 310. For GPU service requests which require the processing of GPU code (e.g., compute kernels) passed from the GPU API 314, the server frontend 322 passes the service requests to the task queue service 324.

The task queue service 324 processes the incoming GPU service requests by inserting one or more tasks associated with GPU service request into a task queue, wherein the queued tasks can be asynchronously pushed to one or more server backend GPU workers 328 for execution at a scheduled time. The runtime task scheduler/dispatcher 326 implements methods for scheduling tasks, which are enqueued in the task queue, for execution by one or more server backend GPU workers 328 using one or more of the GPU devices 230-1, 230-2, . . . , 230-g, which are assigned to handle the tasks. The task scheduler/dispatcher 326 monitors the task queue and utilizes one or more scheduling protocols to determine which tasks should be consumed by the server backend GPU workers 328 at certain times. In one embodiment, the runtime task scheduler/dispatcher 326 utilizes scheduling protocols that take into consideration one or more factors such as task priority, memory location, GPU availability, fairness among all client systems, etc. In one embodiment, the task scheduler/dispatcher 326 comprises a pluggable software component which allows administrators of the GPU server system 200 to select a scheduling protocol which meets their needs and, thereby enabling the input of administrative constraints to govern user consumption and job execution using the GPU resources 230 of the GPU server system 200.

In addition, the runtime task scheduler/dispatcher 326 implements methods to dispatch or otherwise distribute tasks within the task queue among the server backend GPU workers 328 according to the determined schedules for task execution. In one embodiment, the runtime task scheduler/dispatcher 326 pushes queued tasks to the server backend GPU workers 328. The server backend GPU workers 328 execute the dispatched tasks using one or more GPU devices 230-1, 230-2, . . . , 230-g, which are assigned/designated by the runtime task scheduler/dispatcher 326 for executing the dispatched tasks at the scheduled times. In this regard, the task queue service 324, which stores and manages tasks that correspond to GPU service requests from multiple client systems, enables fine-grained sharing of GPU resources among the multiple client systems.

In particular, in one embodiment of the invention, the task queue service 324 enables temporal sharing of the GPU resources by multiple client systems. For example, as noted above, two different client systems can have pending tasks in the task queue which are designated for execution using the same GPU device, but at different times. In this regard, once a first client system is idling (e.g., the user is not executing the GPU-accelerated application, or the GPU-accelerated application is not utilizing the GPU device at a given time), the GPU device can be utilized by a second client system.

Furthermore, in another embodiment of the invention, the task queue service 324 enables spatial sharing of the GPU resources by multiple client systems. For example, spatial sharing of a given GPU by two different client systems allows pending tasks of the different client systems to be concurrently executed using the same GPU device, but using different portions (e.g., different sets of cores) of the GPU device. Therefore, a given GPU device is designated to a first client system, and the first client system cannot fully utilize the given GPU device, then a second client device can utilize another portion of the given GPU device at the same time.

Figure 4:
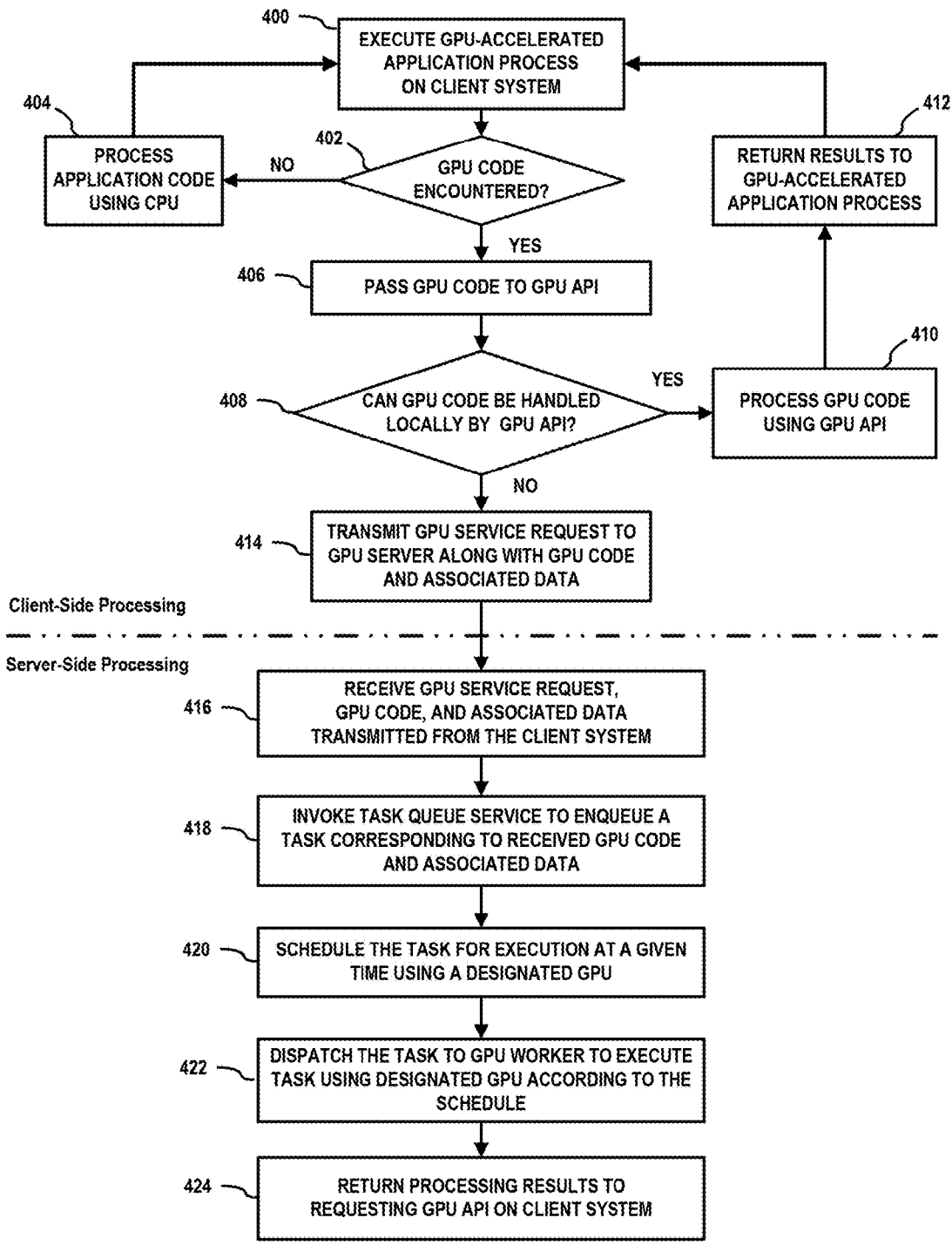
FIG. 4 is a flow diagram that illustrates a method for sharing GPU resources using a queue-based GPU virtualization and management system, according to an embodiment of the invention.

FIG. 4 is a flow diagram that illustrates a method for sharing GPU resources using a queue-based GPU virtualization and management system, according to an embodiment of the invention. For illustrative purposes, the method of FIG. 4 will be discussed in the context of the exemplary run-time system 300 shown in FIG. 3. Referring to FIG. 4, a user will launch a GPU-accelerated application on the client system 310 (block 400). While the GPU-accelerated application process 312 is executing on the client system 310, a determination is continually made as to whether a current block of program code to be executed comprises GPU-related code (determination in block 402). If the current block of program code is not GPU-related code (negative determination in block 402), the GPU-accelerated application process 312 passes the block of program code to the local processor 316 (e.g., CPU) to execute the current block of program code (block 404).

On the other hand, if the current block of program code is GPU-related code (affirmative determination in block 402), the GPU-accelerated application process 312 passes the GPU-related code to the GPU API 314 (block 406). The GPU API 314 determines whether the GPU code can be handled locally by the GPU API 314 (block 408). For example, for static requests (e.g., error checking) that do not need GPU resources 230 of the GPU server system 200, the GPU API 314 can locally process such request and return results to the GPU-accelerated application process 312, thereby reducing communication overhead. In this regard, if it is determined that the GPU API 314 can locally process the current block of GPU-related code (affirmative determination in block 408), the GPU API 314 will process the current block of GPU-related code (block 410) and then return the processing results to the GPU-accelerated application process (block 412). On the other hand, if it is determined that the GPU API 314 cannot locally process the current block of GPU-related code (negative determination in block 408), the GPU API 314 will generate and transmit a GPU service request to the GPU server system 200 (block 414).

In particular, in one embodiment of the invention, the GPU API 314 will transmit the GPU service request to the GPU server system 200, along with the block of GPU code to be executed by the GPU server system 200, as well as any associated data that is locally stored or otherwise accessed by the client system 310. The GPU service request comprises request by the GPU API 314 to execute the GPU code and process the associated data using GPU resources 230 of the GPU server system 200. The GPU service request will include relevant information such as, e.g., an identifier of the client system 310 and/or GPU-accelerated application requesting the GPU service, priority level information, quality of service (QoS) information, metadata associated with the GPU code and/or data that is transmitted to the GPU server system 200, and other types of information that may be utilized by the a queue-based GPU virtualization and management system 320 to implement the GPU service.

Next, on the GPU server-side, the server frontend 322 receives the GPU service request, along with the GPU code and associated data transmitted from the client system 310 (block 416). The server frontend 322 tags the GPU service request with a timestamp which indicates a time that the GPU service request was submitted to the GPU server system 200. The server frontend 322 sends the GPU service request, the GPU code, and associated data to the task queue service 324, which invokes the task queue service 324 to generate one or more tasks based on the GPU code and associated data, and insert the one or more tasks into the task queue (block 418).

The task scheduler/dispatcher 326 monitors the task queue and determines when new tasks have been inserted into the task queue. The task scheduler/dispatcher 326 schedules the new tasks that have been placed into the task queue by scheduling a time for executing the new tasks and designating one or more GPU devices for processing the GPU code associated with the new tasks (block 420). When a new task is placed into the task queue, the task scheduler/dispatcher 326 may dynamically adjust the schedules for executing other tasks depending on the scheduling protocol implemented, e.g., to accommodate for priority levels of tasks or dedicated start times of tasks that must be commenced at user-requested start times, etc. The efficiency of a parallel processing computing system depends on how tightly packed pending tasks can be scheduled so as to maximize system utilization while minimizing wait times. The manner in which tasks are scheduled will depend on the scheduling protocol or queuing model that is implemented by the task scheduler/dispatcher 326. The type of scheduling protocol or queuing model that is implemented will vary depending on the parallel processing environment that is supported by the GPU servers. For example, there may be instances in which the GPU servers provide support for (i) GPU-accelerated applications that are not time or deadline critical and/or (ii) GPU-accelerated applications that require rigid and fixed time slots to execute tasks for real-time applications. In this regard, the task scheduler/dispatcher 326 should be capable of efficiently scheduling homogenous and/or heterogeneous workloads using suitable scheduling protocols that maximize system utilization while minimizing job wait times.

When the scheduled time for a give task execution arrives, the task scheduler/dispatcher 326 will dispatch the given task to the server backend GPU workers 328 to handle execution of the dispatched task using the designated GPU devices according to the task schedule (block 422). With this process, different tasks in the task queue, which are associated with different GPU service requests from different client systems, can be executed utilizing the same designated GPU device, through temporal utilization or spatial utilization of the GPU device, as discussed above. The processing results, which are associated with the GPU service request, are then returned to the requesting GPU API 314 on the client system 310 (block 424), and the GPU API 314 passes the processing results to the GPU-accelerated application process 312. In this regard, a GPU virtualization scheme is implemented in which the GPU-accelerated application process 312 is unaware of the background GPU processing that is performed on the GPU-related code portions of the GPU-accelerated application process 312. The GPU-accelerated application process 312 simply passes GPU-related code (and associated data) to the GPU API 314, and receives GPU processing results associated with GPU-related code from the GPU API 314.

The queue-based GPU virtualization techniques implemented by GPU servers according to embodiments of the invention optimize GPU utilization by allowing fine grained GPU sharing. Indeed, the queue-based GPU virtualization techniques discussed herein allow multiple client systems to concurrently use GPU resources as if the GPU resources are dedicated. The client systems send GPU service requests to a GPU server, and the GPU server stores the tasks associated GPU service requests in a task queue. The task scheduler/dispatcher schedules the times for executing the tasks in the task queue, utilizing the GPU resources in an efficient and fair way, which involves sharing the GPU resources where possible to further optimize GPU utilization.

In another embodiment of the invention, QoS control is enabled by monitoring pending tasks in the task queue. As noted above, the server frontend 322 tags each incoming GPU service request with a timestamp which indicates the time that the GPU service request was submitted to the GPU server. Since the task scheduler/dispatcher 326 knows the time that the GPU service requests are received, and the identity of the client systems associated with the received GPU service requests, the task scheduler/dispatcher 326 can guarantee fair utilization of the GPU resources by all requesting client systems. Moreover, if some tasks in the task queue are pending too long before starting, it can be determined that the GPU server is not capable of handling the workload at that time and some scaling action can be performed either by the administrator or by the server directly to, e.g., increase the amount of GPU resources allocated to the GPU server.

One of ordinary skill in the art can readily envision various use cases for implementing GPUaaS using queue-based GPU virtualization techniques implemented by GPU servers, according to embodiments of the invention. For example, assume there is a research institute where an average of ten researchers use GPU devices on a regular basis. With conventional methods, a team manager would have to purchase at least one GPU device for each researcher to allow the researchers to perform daily work. If a given researcher needed to utilize two GPU devices to perform a given task, the task could not be executed as the given researcher would not be able to access another GPU device allocated to another user. However, by utilizing the queue-based GPU virtualization and management techniques described herein, less than ten GPU devices (e.g., four GPU devices) could be shared among the ten researchers to handle most of the daily requirements of the researchers without any significant degradation in GPU processing performance. With the queue-based GPU virtualization techniques discussed herein, the GPU server can readily process a scaling request from a given user requiring two or more GPU devices by utilizing other installed GPU devices. The queue-based GPU virtualization techniques also allow developers to test their code on a variety of different types of GPU devices, as well as utilizing multiple GPU devices, without changing their local host configuration. For example, scaling of GPU device utilization could be performed in a data center under the guidance of the IT administrator with the developer simply changing a subscription to the service.

Another example use case involves a product environment. Assume that multiple services are hosted in a public or private cloud system and that each service requires GPU processing resources. Moreover, assume that some of the services may need to handle bursts of incoming requests that are to be processed using multiple GPU devices. In conventional configurations, the necessary number of GPU devices would need to be pre-allocated to each service to handle the anticipated bursts of incoming requests. For example, if a data center hosted ten services, where each service would possibly need four GPU devices to process incoming bursts of requests, the data center would have to implement 40 GPU devices (i.e., allocate 4 GPU devices to each service). However, considering that the possibility of such bursts of requests arriving for more than two services at a given time is very low, then it can be determined that less than 40 GPU devices (e.g., eight GPU devices) would be enough to handle such anticipated bursts in requests using the queue-based GPU virtualization and management techniques described herein.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   receiving, by a computer server, a first service request from a graphics processing unit (GPU) application programming interface (API) executing on a first client system for GPU processing services provided by the computer server, wherein the first service request comprises a first block of GPU program code of a GPU-accelerated application executing on a processor of the first client system, and wherein the first service request is generated by the GPU API intercepting an API call of the GPU-accelerated application executing on the processor of the first client system and seamlessly connecting with the computer server to redirect execution of the API call by the computer server in a manner transparent to the GPU-accelerated application;
   enqueuing, by the computer server, a plurality of pending tasks in a front-end task queue, wherein the plurality of pending tasks correspond to a plurality of GPU service requests received from a plurality of client systems, wherein the plurality of pending tasks comprise a first task that corresponds to the first block of GPU program code received from the first client system, and a second task that corresponds to a second block of GPU program code of a GPU-accelerated application executing on a processor of a second client system;
   scheduling, by the computer server, times for executing the pending tasks in the front-end queue using one or more GPU devices;
   dispatching, by the computer server, the first task to a server backend GPU worker process to handle execution of the first task at a scheduled time for the first task using an allocated GPU device; and
   returning processing results of the execution of the first task to the GPU API executing on the first client system to enable the GPU API to pass the processing results to the GPU-accelerated application executing on the processor of the first client system.

2. The method of claim 1, wherein the first service request further comprises a block of data which is to be processed using the first block of GPU program code.

3. The method of claim 1, further comprising:
   wherein in response to intercepting the API call of the GPU-accelerated application executing on the processor of the first client system, the GPU API performing a method comprising:
   receiving GPU-related code corresponding to the intercepted API call;
   determining if the GPU-related code corresponding to the intercepted API call can be processed locally on the first client system;
   processing the GPU-related code locally by the GPU API, in response to determining that the GPU-related code corresponding to the intercepted API call can be processed locally on the first client system; and
   generating the first service request, in response to determining that the GPU-related code corresponding to the intercepted API call cannot be processed locally on the first client system.

4. The method of claim 1, wherein the computer server is part of a server cluster that provides GPU-as-a-Service.

5. The method of claim 1, further comprising dispatching, by the computer server, the second task to a server backend GPU worker process to handle execution of the second task at a scheduled time for the second task using at least the same GPU device allocated for executing the first task.

6. The method of claim 5, wherein the allocated GPU device is shared temporally, wherein the first and second tasks are executed using the allocated GPU device at different times.

7. The method of claim 5, wherein the allocated GPU device is shared spatially, wherein both the first and second tasks are concurrently executed using the allocated GPU device.

8. An article of manufacture comprising a processor-readable storage medium having stored therein program code of one or more software programs, wherein the program code is executable by one or more processors to implement a process comprising:

receiving, by a computer server, a first service request from a graphics processing unit (GPU) application programming interface (API) executing on a first client system for GPU processing services provided by the computer server, wherein the first service request comprises a first block of GPU program code of a GPU-accelerated application executing on a processor of the first client system, and wherein the first service request is generated by the GPU API intercepting an API call of the GPU-accelerated application executing on the processor of the first client system and seamlessly connecting with the computer server to redirect execution of the API call by the computer server in a manner transparent to the GPU-accelerated application;

enqueuing, by the computer server, a plurality of pending tasks in a front-end task queue, wherein the plurality of pending tasks correspond to a plurality of GPU service requests received from a plurality of client systems, wherein the plurality of pending tasks comprise a first task that corresponds to the first block of GPU program code received from the first client system, and a second task that corresponds to a second block of GPU program code of a GPU-accelerated application executing on a processor of a second client system;

scheduling, by the computer server, times for executing the pending tasks in the front-end queue using one or more GPU devices;

dispatching, by the computer server, the first task to a server backend GPU worker process to handle execution of the first task at a scheduled time for the first task using an allocated GPU device; and returning processing results of the execution of the first task to the GPU API executing on the first client system to enable the GPU API to pass the processing results to the GPU-accelerated application executing on the processor of the first client system.

9. The article of manufacture of claim 8, wherein the first service request further comprises a block of data which is to be processed using the first block of GPU program code.

10. The article of manufacture of claim 8, wherein the program code is executable by the one or more processors to implement a process comprising dispatching, by the computer server, the second task to a server backend GPU worker process to handle execution of the second task at a scheduled time for the second task using at least the same GPU device allocated for executing the first task.

11. The article of manufacture of claim 10, wherein the allocated GPU device is shared temporally, wherein the first and second tasks are executed using the allocated GPU device at different times.

12. The article of manufacture of claim 10, wherein the allocated GPU device is shared spatially, wherein both the first and second tasks are concurrently executed using the allocated GPU device.

13. The article of manufacture of claim 8, wherein the program code is executable by the one or more processors to implement a process comprising:

wherein in response to intercepting the API call of the GPU-accelerated application executing on the processor of the first client system, the GPU API performing a method comprising:

receiving GPU-related code corresponding to the intercepted API call;

determining if the GPU-related code corresponding to the intercepted API call can be processed locally on the first client system;

processing the GPU-related code locally by the GPU API, in response to determining that the GPU-related code corresponding to the intercepted API call can be processed locally on the first client system; and generating the first service request, in response to determining that the GPU-related code corresponding to the intercepted API call cannot be processed locally on the first client system.

14. The article of manufacture of claim 8, wherein the computer server is part of a server cluster that provides GPU-as-a-Service.

15. A system, comprising:

a computer server comprising at least one processor, and a memory to store program code that is executable by the at least one processor to implement a process comprising:

receiving, by the computer server, a first service request from a graphics processing unit (GPU) application programming interface (API) executing on a first client system for GPU processing services provided by the computer server, wherein the first service request comprises a first block of GPU program code of a GPU-accelerated application executing on a processor of the first client system, and wherein the first service request is generated by the GPU API intercepting an API call of the GPU-accelerated application executing on the processor of the first client system and seamlessly connecting with the computer server to redirect execution of the API call by the computer server in a manner transparent to the GPU-accelerated application;

enqueuing, by the computer server, a plurality of pending tasks in a front-end task queue, wherein the plurality of pending tasks correspond to a plurality of GPU service requests received from a plurality of client systems, wherein the plurality of pending tasks comprise a first task that corresponds to the first block of GPU program code received from the first client system, and a second task that corresponds to a second block of GPU program code of a GPU-accelerated application executing on a processor of a second client system;

scheduling, by the computer server, times for executing the pending tasks in the front-end queue using one or more GPU devices;

dispatching, by the computer server, the first task to a server backend GPU worker process to handle execution of the first task at a scheduled time for the first task using an allocated GPU device; and returning processing results of the execution of the first task to the GPU API executing on the first client system to enable the GPU API to pass the processing results to the GPU-accelerated application executing on the processor of the first client system.

16. The system of claim 15, wherein the first service request further comprises a block of data which is to be processed using the first block of GPU program code.

17. The system of claim 15, further comprising dispatching, by the computer server, the second task to a server backend GPU worker process to handle execution of the second task at a scheduled time for the second task using at least the same GPU device allocated for executing the first task.

18. The system of claim 17, wherein the allocated GPU device is shared temporally, wherein the first and second tasks are executed using the allocated GPU device at different times.

19. The system of claim 17, wherein the allocated GPU device is shared spatially, wherein both the first and second tasks are concurrently executed using the allocated GPU device.

20. The system of claim 15, wherein the computer server is part of a server cluster that provides GPU-as-a-Service.

* * * * *